United States Patent [19]
Wheatley

[11] Patent Number: 5,121,960
[45] Date of Patent: Jun. 16, 1992

[54] RAIL ATTACHMENT SYSTEM FOR TONNEAU COVER

[76] Inventor: Donald G. Wheatley, 4451 Ford Rd., Ann Arbor, Mich. 48105

[21] Appl. No.: 612,482

[22] Filed: Nov. 14, 1990

Related U.S. Application Data

[63] Continuation-in-part of Ser. No. 339,223, Apr. 17, 1989, Pat. No. 5,058,052.

[51] Int. Cl.$^5$ .............................................. B60P 7/04
[52] U.S. Cl. ..................... 296/100; 296/104; 160/368.1; 248/503
[58] Field of Search ............... 296/36, 39.2, 100, 214, 296/104, 118; 160/327, 368.1; 248/503, 505, 558

[56] References Cited

U.S. PATENT DOCUMENTS

| | | | |
|---|---|---|---|
| 2,565,746 | 8/1951 | Turner | 296/104 |
| 3,923,334 | 12/1975 | Key | 296/10 |
| 4,639,033 | 1/1987 | Wheatley et al. | 296/100 |
| 4,730,866 | 3/1988 | Nett | 296/100 |
| 4,838,602 | 6/1989 | Nett | 296/100 |

FOREIGN PATENT DOCUMENTS 3812506  9/1989  Fed. Rep. of Germany ...... 296/100

*Primary Examiner*—Dennis H. Pedder
*Attorney, Agent, or Firm*—Charles W. Chandler

[57] ABSTRACT

A clamping apparatus for releasably attaching a flexible tonneau cover to the upper flange of a pickup truck cargo box sidewall. The apparatus includes a frame having a rail mounted around the top of the sidewall. The rail has a slot facing away from the cargo area for connecting the tonneau cover edge to the rail. The rail has a second slot facing inwardly toward the cargo area for releasably receiving the end of a L-shaped upper clamping clip. The clip is received in the slot and slid along the rail to a desired position. Each upper clip has a vertical leg mounted adjacent the inside flange of the cargo box sidewall. A C-shaped lower clip, mounted behind the flange, has a midsection adapted to receive a threaded fastener which is also passed through an opening in the vertical leg of the upper clip. The upper clip also has structure at an adjusted height above the cargo box floor for receiving the end of a slat which supports the tonneau cover.

20 Claims, 4 Drawing Sheets

RAIL ATTACHMENT SYSTEM FOR TONNEAU COVER

CROSS REFERENCE TO RELATED APPLICATION

This application is a continuation-in-part of application Ser. No. 339,223, filed Apr. 17, 1989, now U.S. Pat. No. 5,058,652, issued Oct. 22, 1991, for "Tonneau Cover".

BACKGROUND OF THE INVENTION

This invention is related to tonneau covers for enclosing the cargo area of a vehicle such as a pickup truck, a boat or other structures with a flexible cover.

This invention is an improvement over U.S. Pat. No. 4,639,033 which issued Jan. 27, 1987 for a Tonneau Cover, and also an improvement over the aforementioned co-pending patent application. The aforementioned patent application and the patent disclosed a tonneau system for a basically non-resilient cover, having a J-shaped fastening member attached along the marginal edge of the cover. An L-shaped rail is mounted on the top flange of the pickup truck cargo box. The horizontal portion of the rail has a lip for receiving the J-shaped fastener. The J-shaped fastener is resilient so that it can be either snapped on or unwound from the lip. In addition, the resiliency of the fastener compensates for temperature changes causing expansion and contraction of the cover.

The cross-section of the rail has a vertical leg mounted adjacent the downwardly depending inside flange of the cargo box. The rail is held in place by a series of C-shaped clamps that receive the lower edge of a rail and the cargo box flange. A threaded fastener is passed through one leg of the C-shaped clamp to engage the cargo box flange to hold the clamp in position. The opposite leg of the clamp is adapted to receive the end of a slat which spans the cargo box area for supporting the tonneau cover in position.

U.S. Pat. Nos. 4,730,866 and 4,838,602 which issued respectively Mar. 15, 1988 and Jun. 13, 1989 to James A. Nett, disclose a supporting frame for a tonneau cover in which a rail is also mounted on the cargo box upper edge, adjacent the inside flange. The Nett rail includes upper and lower generally horizontal walls connected by a vertical web to form opposed inner and outer laterally-open slots. The outer slot slideably receives a snap fastener. The snap fastener mates with a complementary button on the tonneau cover. Nett employs a clamp for connecting the rail to the pickup truck sidewall. The clamp supports a bolt with a nut received in the inner slot of the rail. The clamp has a throat which receives the inside flange of the cargo box sidewall, and a lower lateral arm which engages the inside surface of the cargo box sidewall.

SUMMARY OF THE INVENTION

The broad purpose of the present invention is to provide an improved tonneau cover supporting rail system. The preferred embodiment of the invention employs a four-sided frame having an aluminum rail mounted along the top horizontal flange of the cargo box sidewalls. The preferred rail has upper and lower, generally horizontal walls connected by a pair of spaced webs. The outermost of the two webs forms a lip with the top wall for engaging the J-shaped clip of the type illustrated in my aforementioned patent. The inner web is spaced from the inner edges of the upper and lower walls to form a C-shaped inside slot. The slot has upper and lower lips adjacent the slot opening, and an intermediate lip on the web.

The rail is mounted on the cargo box by a series of pairs of cooperating clamping clips. An upper clip has a horizontal leg which is parallel to and above the top wall of the cargo box sidewall, and a vertical leg mounted adjacent the inside flange of the cargo sidewall. The outer end of the upper leg has structure engaging the lips in the slot in such a manner that the clip can be easily snapped into or removed from the rail without the use of fastening means. The vertical leg of the clip has structure adapted to receive the end of a tubular slat at an adjusted height above the cargo box floor. The slat supports the tonneau cover.

The second or lower clip has a generally C-shaped configuration. The cargo box vertical flange is clamped between the two clips.

The preferred rail can also be formed with an inside slot having the configuration as described, but with an outer structure for supporting a snap fastener which engages a button attached to the tonneau cover.

The preferred embodiment of the invention provides several improvements over my aforementioned patent and co-pending application, as well as the Nett references. Regarding the Nett references, the preferred embodiment has fewer parts. The clips can be assembled on the rail either before or after the four-sided frame is assembled, whereas in the Nett design, the nuts must be inserted in the rail before the frame is assembled. The preferred tonneau system can be disassembled easily without taking the rail apart. The preferred clips can be quickly and easily repositioned. The rail is relatively inexpensive to manufacture. In addition, there are no nuts which may rattle.

The snap-on clips can be assembled on the rail after the frame is assembled. The snaps can be removed for repair without frame disassembly. When the tonneau cover is removed, the snaps do not slide up and down the rail making noise. The snaps do not slide off the rail when the tonneau is disassembled, making them difficult to lose. The snaps stay in position when the cover is removed making re-attachment easier and quicker, since the snaps do not have to be repositioned. The snaps can also be easily positioned.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
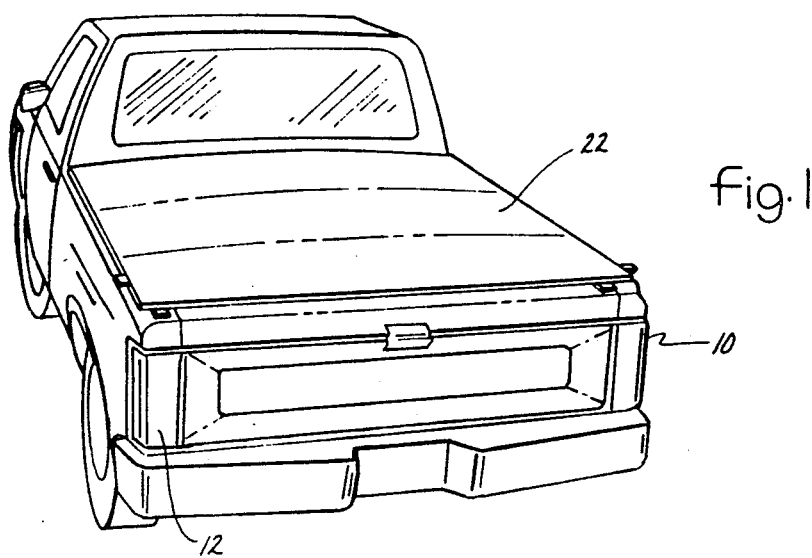
FIG. 1 is a view showing the preferred tonneau cover mounted on a cargo box of a conventional pickup truck.
Figure 2:
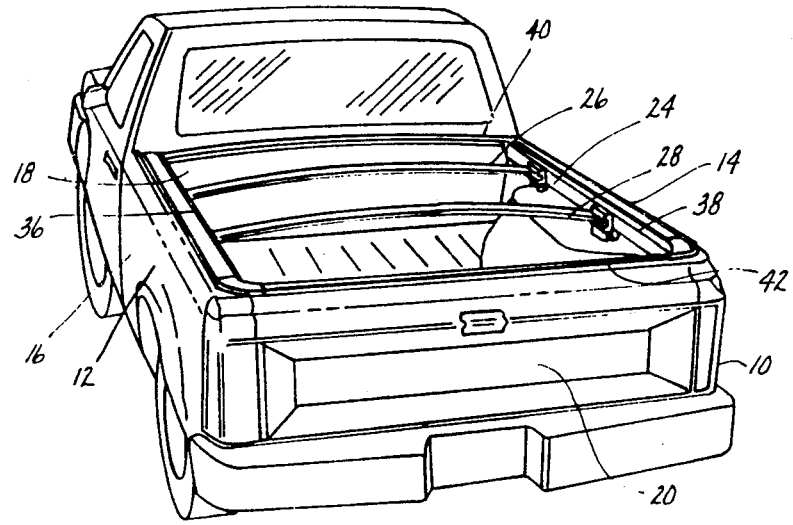
FIG. 2 is a view similar to FIG. 1, but showing the cover removed to expose the frame and the slats.

FIGS. 1 and 2 illustrate a conventional pickup truck 10 having a cargo box 12. The cargo box is bounded by a pair of sidewalls 14 and 16, a front wall 18 and a tail gate 20. A relatively nonresilient, flexible tonneau cover 22 is supported on the cargo box by a four-sided frame 24 mounted on the three walls and the tail gate, and a pair of slats 26 and 28 having their ends connected to opposite sides of the frame. Two sides of the frame are mounted on the cargo box sidewalls.

Figure 4:
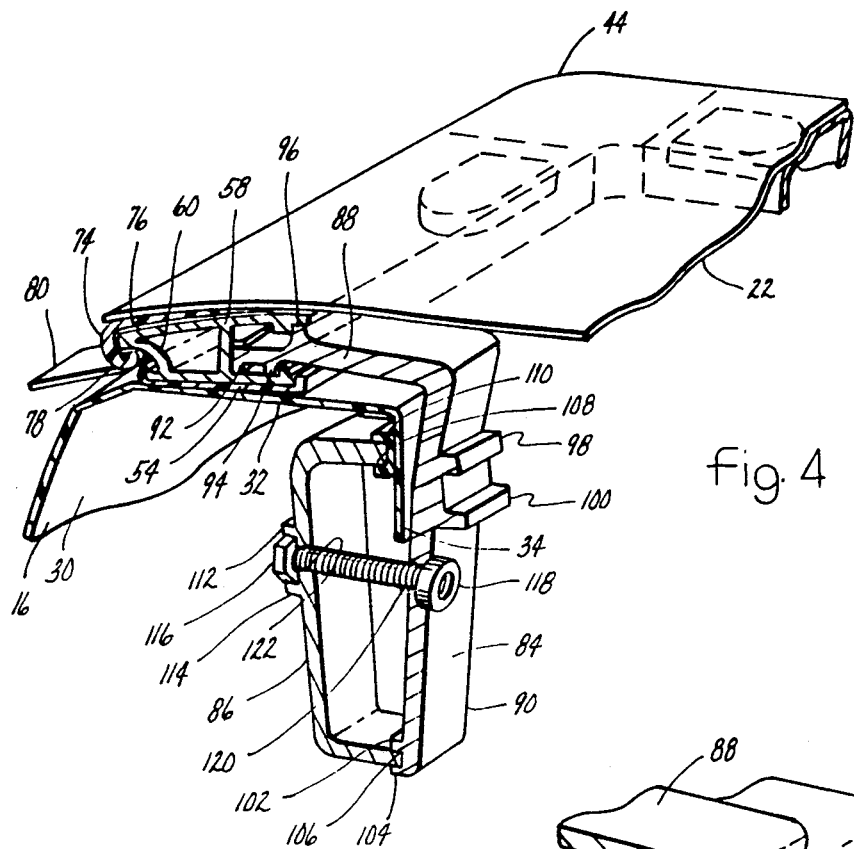
FIG. 4 is an enlarged cross-sectional view of the preferred clip means.

A typical sidewall is illustrated in FIG. 4 and comprises a generally vertical outside wall 30, a horizontal wall 32, and a flange 34 which extends downwardly from the inner edge of wall 32.

Figure 7:
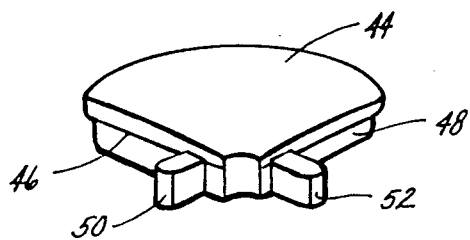
FIG. 7 is a view of a typical corner element.

The frame comprises a pair of similarly-shaped, extruded aluminum side rails 36 and 38, forward rail 40 and rear rail 42. The four rails are connected at each corner by a corner member. A typical corner member 44, illustrated in FIG. 7, has a somewhat triangular configuration with a pair of walls 46 and 48, disposed at right angles, one to the other, for abutting the ends of their associated rails. The corner member also has a pair of tongues 50 and 52 that are received in openings in the rail ends. Fastener members (not shown) fasten the corner members to the rails.

Referring to FIG. 4, a non-marring, sealing, preferably foam tape 54 is mounted on the bottom horizontal portion of each of the four extruded rails.

Figure 11:
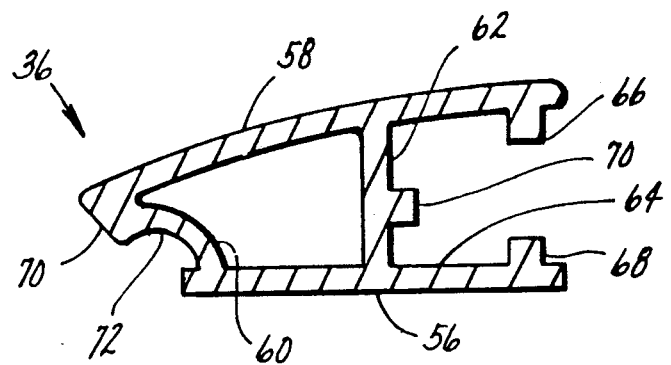
FIG. 11 is a cross-sectional view of the preferred rail.

Referring to FIG. 11, a preferred rail includes a bottom, horizontal base wall 56, and an upper roof wall 58 slightly inclined from the horizontal. A curved web 60 has its ends connected to the upper and lower walls. A vertical web 62 also has its upper and lower edges attached to the upper and lower walls. Web 62 is spaced inwardly from the right-most or inside edges of the upper and lower walls to form a generally C-shaped slot 64. A lip or flange 66 is slightly spaced from and parallel to the outer edge of upper wall 58, and extends toward the lower wall. A second lip or flange 68 is slightly spaced from the inner edge of the lower wall. Lip 68 extends toward lip 66, and is parallel to lip 66. A third lip 70 is mounted near the midsection of web 62, within slot 64. Lip 70 is parallel to lips 66 and 68. The upper face of wall 56 cooperates with lip 68 and web 62 to form an upwardly facing groove 69.

Referring to FIGS. 4 and 11, web 60 and upper wall 58 are joined to form a lip 71 and an outward-facing slot 72. Lip 71 and slot 72 are adapted to receive a J-shaped flexible fastener 74 in the manner described in our aforementioned patent. Fastener 74 is a plastic, resilient member attached, as by stitching, along the edge of cover 22. Fastener 74 has a cross-section with a long wall 76 and a short, hook-shaped wall 78. The shorter wall is resilient so that it can be unwound from an attached position in which the extreme edge of wall 78 is disposed in slot 72.

Figure 3:
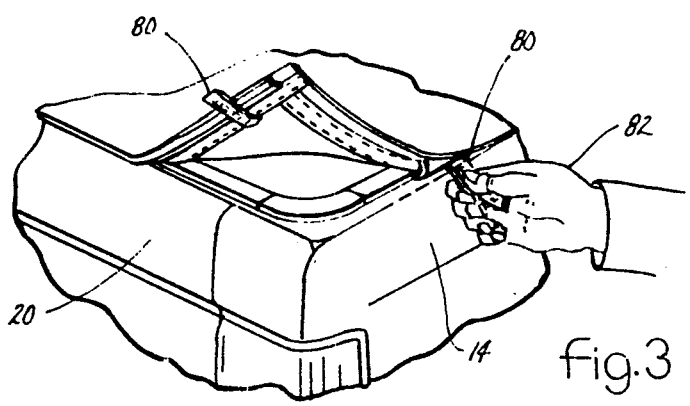
FIG. 3 is a view showing the manner in which the tonneau cover is removed from a rail.

The fastener can be unwound from lip 71 by flexing the hook-shaped wall away from the longer wall and lip 71. This is assisted by a fabric tab 80 which is attached to the cover and the fastener. Tab 80 extends along the inner surface of the fastener to a position illustrated in FIG. 4, in which the tab extends around the hook-shaped end of the fastener where the user can grasp the tab. This is more clearly illustrated in FIG. 3. User 82 has grasped tab 80, and by pulling on the tab, causes the fastener to unwind like a clock spring away from the rail. Preferably, the tabs are mounted near the corners of the cover so that by grasping the fastener, the user can begin to unwind the fastener starting near the end of the rail. Once the fastener begins to separate from the rail, the user progressively pulls the remainder of the fastener along the rail.

Figure 12:
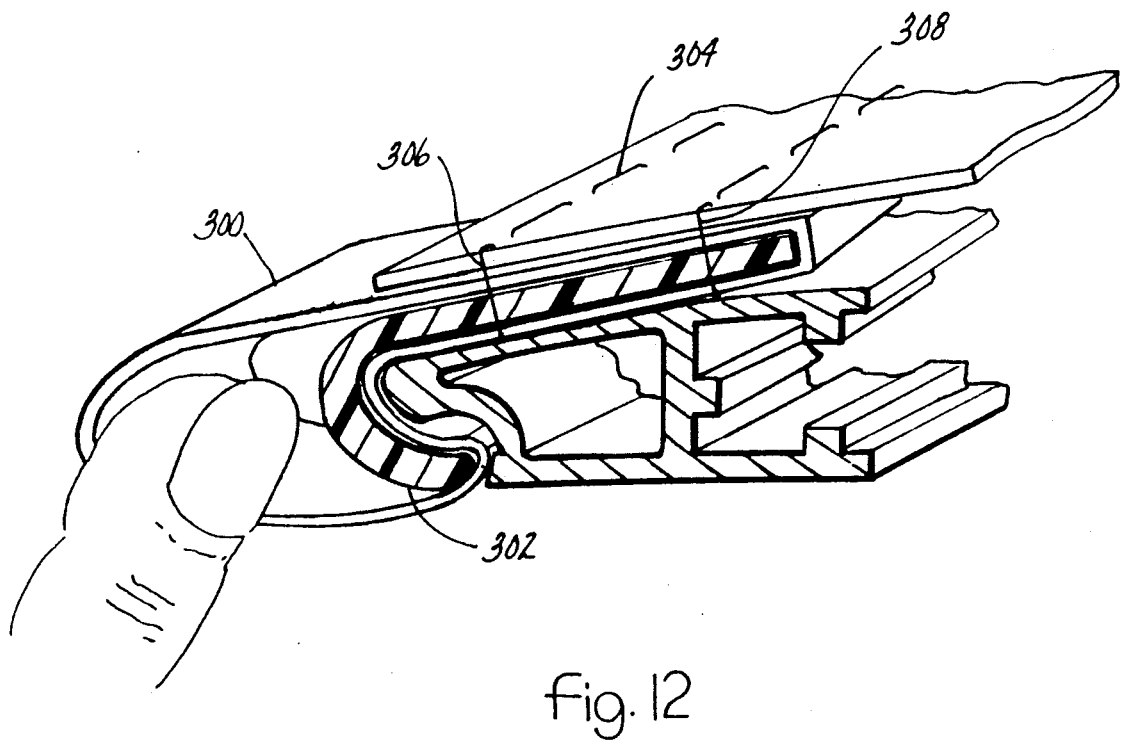
FIG. 12 illustrates another type of pull tab.

The tabs may be either a single tab, or a loop sewn on the sides of the J-shaped fastener, see FIG. 12. Tab 300 is wrapped around fastener 302 and attached to cover 304 by stitching 306 and 308.

Similarly, the fastener can be mounted on the rail by simply disposing the hook-shaped end of the fastener on top of lip 71 and by pressing downwardly, snap the fastener around the edge of the lip into slot 72. The resilient nature of the fastener permits it to maintain the cover in a taut condition, even though the cover may expand and contract due to temperature variations. The resilient end of the fastener winds or unwinds around lip 71 to accommodate the shrinkage or expansion of the cover.

Figure 5:
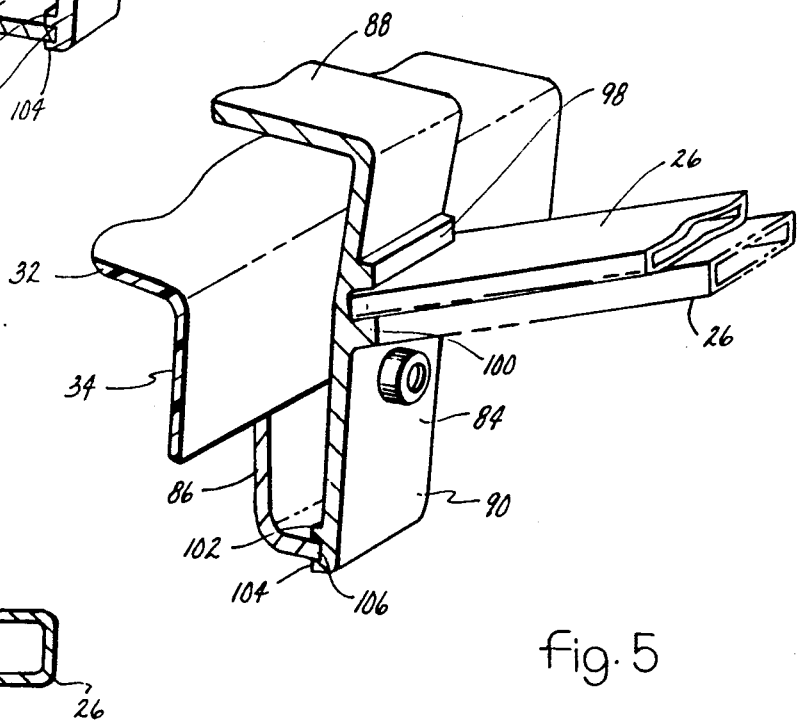
FIG. 5 is a view showing the manner in which a slat is connected to a rail.

The rails are mounted on the horizontal flange of the cargo box and connected to the flange by pairs of elongated matching clamping members or clips. A typical pair is illustrated in FIGS. 4 and 5 at 84 and 86. Upper clip 84 has an inverted L-shaped configuration which includes an upper horizontal leg 88 which is parallel to and above horizontal wall 32 of the cargo box, and a vertical leg 90 which is mounted parallel to and adjacent the inside flange 34 of the cargo box. Leg 88 has an end with a reduced thickness and a pair of spaced, parallel lips 92 and 94. Lip 92 is adjacent the extreme end of leg 88. Lips 92 and 94 cooperatively form a downwardly extending hook for entry into groove 69 (FIG. 11).

The thickness of the outer end of leg 88 is less than the opening between lips 68 and 66. Lips 92 and 94 are spaced a distance slightly less than the distance between web 62 and lip 68 of the rail. The two lips are at right angles to the longitudinal axis of the clip. The end of the clip is inserted inside slot 64 with lip 92 in abutment with base wall 56. The extreme end of the clip is mounted behind lip 68 and beneath lip 70.

The clip also has an upper lip 96, parallel to lips 92 and 94 and spaced from the extreme end of the clip. Lip 96 abuts the outer longitudinal edge of lip 66. The arrangement is such that the clip can be snapped into the slot between lips 68 and 70, to a position in which it can be slid along slot 64 before the clip is attached to flange 34. Lips 92 and 96 oppose any tendency of the rail to pivot around the end of the clip under the influence of a tensile force applied by cover 22. The clip can be easily inserted or removed from slot 64 by a motion transverse to the longitudinal axis of the rail without the use of any fasteners.

Figure 6:
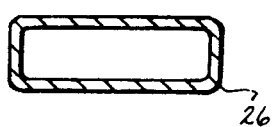
FIG. 6 is a cross-sectional view of a preferred slat.

Leg 90 has a pair of spaced parallel, inside lips or ribs 98 and 100, best illustrated in FIG. 5. Lips (ribs) 98 and 100 are dimensioned to snugly receive the open end of a typical slat such as is illustrated in FIG. 6. Lips 98 and 100 are spaced a distance accommodating the outside short dimension of slat 26.

The slat can be mounted in any of 3 heights above the cargo box floor. In the lowermost position, the end of the slat snugly receives lip 100. In the intermediate position, the slat can be snugly slid between lips 98 and 100. The slat can also be mounted in an upper position in which its open end snugly receives lip 98. The other end of the slat is mounted in a similar manner on a clip on the opposite side of the cargo box.

The lower end of clip 84 has a pair of parallel lips 102 and 104 which extend from the extreme end of the clip toward the cargo box outer wall. Lips 102 and 104 are spaced a distance adapted to receive the lower end 106 of clip 86. Clip 86 has, as previously mentioned, a somewhat C-shaped appearance. Its upper edge 108 is adapted to engage flange 34. Preferably, a rubber U-shaped section 110 is mounted around the outer edge of clip 108 for engaging the inner side of the flange.

The midsection of clip 84 has a pair of parallel lips 112 and 114 that extend the width of the clip. Lips 112 and 114 are spaced a distance slightly greater than the width of a hex nut 116, as illustrated in FIG. 4. The two lips prevent the nut from turning.

A threaded fastener 118 is mounted in fastener opening 120 in vertical leg 90 of clip 84, and through fastener opening 122 in clip 86 for clamping flange 34 between the two clips. By releasing fastener 118, clip 86 can be separated from clip 84. Clip 84 is separated from the rail by swinging the lower end of the clip toward the frame, that is clockwise as viewed in FIG. 4. To mount the clip on the rail, the upper end of clip 84 is snapped into slot 64. The lower end of the clip pivots counter-clockwise, and then is fastened to clip 86 by the fastener means. As shown in FIG. 4, the upper portion of vertical leg 90 is angled slightly away from the surface of flange 34 so that leg 90 has a localized area of engagement with the flange near its lower end.

Thus, it can be understood that I have described a novel rail structure and clip assembly that can be easily mounted, assembled or disassembled with a minimum of threaded fasteners and without forming any holes in the cargo box.

Figure 8:
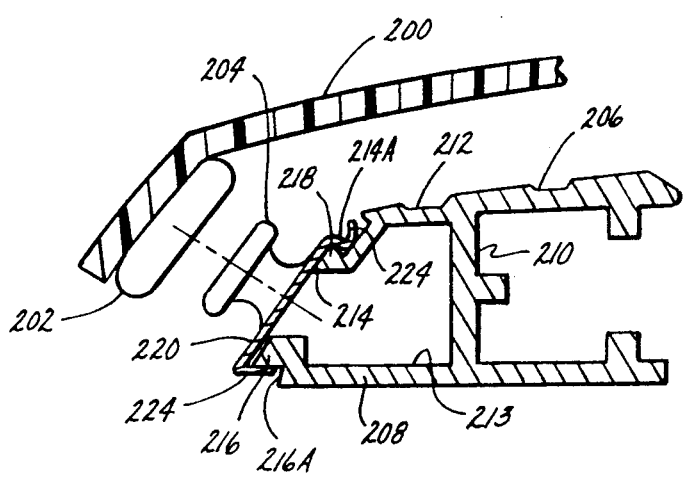
FIG. 8 is a view of another embodiment of the rail for mounting a snap fastener.
Figure 9:
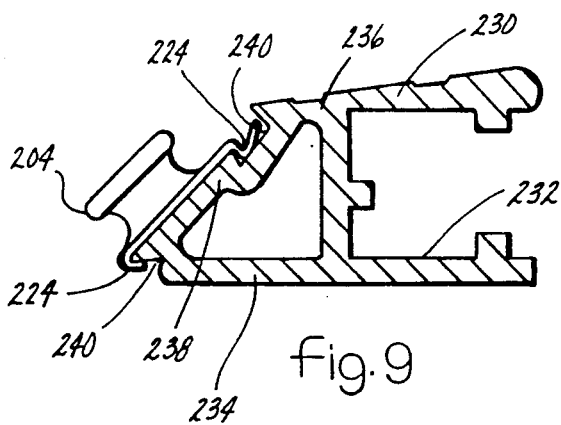
FIG. 9 is a view similar to FIG. 8, but showing another embodiment for mounting the snap fastener.
Figure 10:
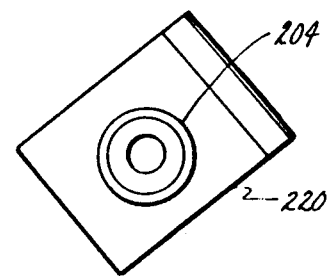
FIG. 10 is a view of the snap fastener as seen along lines 10—10 of FIG. 9.

FIGS. 8-10 illustrate another embodiment of the invention using a cover 200 which is identical to cover 22, but employs a series of conventional snap buttons 202, each having an internal opening which is mounted over a conventional male snap fastener 204.

Referring to FIG. 8, rail 206 has a similar cross-section to that of rail 36 illustrated in FIG. 11, that is with an inside slot adapted to receive clip 84. However, rail 206 has a base wall 208 connected by a web 210 to an upper wall 212 to form an outer facing slot 213 having an opening 214. In this embodiment of the invention, one edge 216 of the slot has a lip adapted to cooperate with a lip 218 on the opposite side of opening 214 to snugly the sheet metal base 220 for the snap fastener; each base 220 constitutes a slide element for adjusting the associated snap fastener 204 along rail 36. Snap fastener base 220 has a channel-shaped configuration with inwardly-facing lips or flanges 222 and 224.

Lips 218 and 216 define a pair of slots 214A and 216A which face in opposite directions. The extreme edge of fastener lip 224 is received in rail slot 216A. Lip 222 of the base has a rounded configuration so that it can be snapped around lip 218 to a position in which the base of the snap fastener snugly embraces both lips 216 and 218, but can also be repositioned along the rail by pushing the base along the rail. As will be seen from FIG. 8, lips 216 and 218 effectively form a track having a major guide face and two side edges extending at acute angles from said major face in a wedge configuration; each snap fastener 204 is carried on a slide element 220 that includes a flat base wall positioned on the track major face, and two inturned flanges 222 and 224 acutely angled to the base wall to lie against the outer side edges of lips 216 and 218. Each slide element and associated snap fastener can be installed on the track or removed from the track without removing rail 206 from its clamped position on the vehicle sidewall.

FIG. 9 illustrates another embodiment of the invention in which rail 230 has a slot 232 identical to slot 64 of the embodiment of FIG. 11, including a base wall 234 and an upper wall 236. However, in this embodiment, the outer edges of wall 234 and 236 are connected by an inclined web 238. The seam between web 238 and base wall 234 forms slot 240 for receiving the lower lip 224 of the fastener. The web is also connected to the upper wall to define a slot 240 for receiving the rounded lip 224 of the fastener base. In this version of the invention, the snap fastener can be easily snapped-on or removed from the rail. When mounted on the rail, it can be easily re-positioned along the rail to a position accommodating the complementary button on the cover.

It is to be understood that snap fastener 204 and button 202 are commercially-available snap fasteners well known to those skilled in the art. It is the rail structure on which the base of fastener 204 is mounted that provides the special, structural features of this part of the invention.

Having described my invention, I claim:

1. Tonneau means for covering the cargo area of a vehicle, said vehicle having a pair of spaced sidewalls; each sidewall having an outside wall, an upwardly facing top surface (32), and an inner downwardly depending flange (34); said tonneau means comprising:

a flexible cover having side edges locatable above the vehicle sidewalls so that the cover can extend over the vehicle cargo area;

a frame, including an elongated rail mounted on the top surface on each vehicle sidewall;

each rail having an outer edge and an inner edge;

means on the outer edge of each rail for releasably attaching an edge area of the flexible cover to the rail;

the inner edge of each rail having a longitudinally extending slot presented to the cargo area; and a plural number of clamping assemblies for removably clamping each rail to an associated vehicle sidewall; each said clamping assembly comprising a first clip member, a second clip member, and a threaded connector means connected between the two clip members; each said first clip member having a first leg adapted to overlie the top surface of an associated vehicle sidewall, and a second leg adapted to extend downwardly alongside the depending flange of the vehicle sidewall; each said second clip member having an upper leg engagable with the downwardly, depending flange of the vehicle sidewall, and a lower leg engagable with the second leg of the first clip member below the downwardly, depending flange;

each said threaded connector means being adapted to extend through the second leg of the first clip member to force the two clip members into clamping engagement with the downwardly, depending flange on the associated vehicle sidewall; each said first clip member being a unitary one-piece member having an integral lip means (92, 94) extending downwardly from its first leg for entry into said longitudinally extending slot at any point along the length of the slot; said downwardly-extending lip means having an interlocking connection with the associated rail whereby each said first clip member can be slidably repositioned along the length of the rail without disengaging said first clip member from the rail.

2. Tonneau means as defined in claim 1, said first leg of said first clip member having an integral abutment means (96) engageable with an inner edge of the associated rail above said lip means to prevent the rail from overturning under the tension applied by the tonneau cover to the rail.

3. Tonneau means as defined in claim 2, wherein said abutment means comprises a second lip means (96) extending upwardly from said first leg.

4. Tonneau means as defined in claim 1, each said rail comprising a base wall (56) seatable on the top surface of a vehicle sidewall, and an upper roof wall (58) extending above the base wall; said longitudinally-extending slot being defined in part by a first flange (68) extending upwardly from the base wall, and a second flange (66) extending downwardly from the roof wall; each said first clip member being manipulatable so that the downwardly extending lip means on its first leg can pass through the space between the two flanges for entry into the associated slot.

5. Tonneau means as defined in claim 4, wherein each said first clip means includes a second lip means (96) engageable against said second flange to limit insertional movement of the first lip means into the slot; said second lip means constituting an abutment means for preventing overturnment of the rail under the tension applied by the tonneau cover to the rail.

6. Tonneau means as defined in claim 1, said second leg of each first clip member having a channel shaped seat adapted to loosely receive the lower leg of the associated second clip member for properly orienting the two clip members in a clamping position embracing the downwardly, depending flange on the vehicle sidewall.

7. Tonneau means as defined in claim 1, each said second clip member being dimensioned so that it can fit into the space between the outside wall of the vehicle sidewall and the associated downwardly depending flange without contacting the outside wall whereby the clamping action of the first and second clip members is entirely independent of the spacing between the outside wall and the downwardly depending flange.

8. Tonneau means as defined in claim 1, and further comprising two vertically-spaced ribs (98 and 100) projecting from the second leg of said first clip member, and a hollow tubular slat (26) for supporting the flexible cover against sagging into the cargo area; said slat having an internal cross-section adapted to receive either of said ribs, whereby the slat can have one end thereof telescoped onto either rib; the vertical spacing of the ribs constituting a means for vertical adjustment of the slat.

9. Tonneau means as defined in claim 1, said cover attaching means comprising a track extending along the rail outer edge, and a plural number of snap fastener-supporting slide elements slidably positioned on said track for slidable adjustment parallel to the rail outer edge; said track having a major guide face and two side edges extending at angles from said major face in a wedge configuration; each slide element comprising a base wall slidably positioned on said major guide face, and two inturned facing flanges (222, 224) acutely angled to the base wall so as to lie against the track side edges; each slide element having a snap fit around the track whereby each slide element can be installed on the track or removed from the track without removing the rail from its clamped position on the vehicle sidewall.

10. Tonneau means for covering the cargo area of a vehicle, wherein the vehicle has a pair of spaced sidewalls, each sidewall including an outside wall portion (30), a generally horizontal wall portion (32), and an inner downwardly-depending flange (34) extending from the horizontal wall portion in spaced relation to the outside wall portion, said flange having a lower edge spaced below the horizontal wall portion, and an inner face and an outer face, said tonneau means comprising:

a flexible cover having side edges locatable above the spaced sidewalls so that said cover then extends over the cargo area located between the pair of spaced sidewalls;

a frame including an elongated rail seatable on the horizontal wall portion of at least one of the vehicle sidewalls; said rail having an outer edge area located relatively far away from the cargo area, and an inner edge area located relatively near to the cargo area; means on the outer edge area of said rail for attaching the flexible cover to the rail; the inner edge area of said rail forming an upwardly facing groove (69); and means for removably clamping said rail to the horizontal wall portion of the associated sidewall; said clamping means comprising a first clip member, a second clip member, and a threaded connector means connected between the two clip members; said first clip member having a first leg formed with a hooked end engageable in said groove, and a second leg having localized engagement against the inner face of the associated downwardly depending flange at a flange engagement point; said second leg having a lower end portion located below the lower edge of said downwardly depending flange; said second clip member comprising a web portion, an upper leg engageable with the outer face of the downwardly depending flange above the flange engagement point of said second leg, and a lower leg having localized engagement with the lower end portion of said second leg; said threaded connector means being connected between the web portion of the second clip member and the second leg of the first clip member so that when the connector means is tightened, the hooked end of the first clip member opposes pivotal motion of the rail around the hooked end of the first clip member caused by the flexible cover.

11. Tonneau means as defined in claim 10, the lower end portion of said second leg having a channel-shaped cross-section; the lower leg of said second clip member being receivable with the channel-shaped cross-section so that the web portion of the second clip member can move toward or away from the second leg of the first clip member.

12. Tonneau means as defined in claim 10, wherein said rail comprises a lower wall (56) seatable on the horizontal wall portion of the associated vehicle sidewall, and an upper wall (58) spaced above said lower wall; said groove being formed in part by a first lip (68) extending upwardly from said lower wall; and a second lip (66) extending downwardly from said upper wall directly above said first lip, said first clip member having a third lip (96) extending upwardly from said first leg into abutment with said second lip to prevent overturnment of the rail under the influence of a tensile force applied by the cover.

13. Tonneau means as defined in claim 12, wherein said first clip member is of a one-piece construction.

14. Tonneau means as defined in claim 10, said second clip member being spaced from the outside wall portion of the associated vehicle sidewall so that the clamping action of the first and second clip members is entirely independent of the spacing between the outside wall portion and the downwardly depending flange.

15. Tonneau means as defined in claim 10, said threaded connector means comprising a single bolt extending through aligned openings in the second leg of the first clip member and the web portion of the second clip member.

16. Tonneau means as defined in claim 15, said web portion of the second clip member being spaced from the second leg of the first clip member so that when the single bolt is tightened, the web portion is enabled to move toward the second leg without striking said second leg.

17. Tonneau means as defined in claim 10, and further comprising two vertically-spaced ribs (98 and 100) projecting from the second leg of said first clip member, and a hollow tubular slat (26) for supporting said flexible cover against sagging into the cargo area; said slat having an internal cross-section mated to the rib, whereby the slat can have one end thereof selectively telescoped onto either rib.

18. Tonneau means as defined in claim 10, said cover attaching means comprising a track extending along the rail outer edge, and a plural number of snap fastener-supporting slide elements slidably positioned on said track for slidable adjustment parallel to the rail outer edge; said track having a major guide face and two side edges extending at acute angles from said major face in a wedge configuration; each slide element comprising a base wall slidably positioned on said major guide face, and two inturned facing flanges (222 and 224) acutely angled to the base wall so as to lie against the track side edges; each slide element having a snap fit around the track whereby each slide element can be installed on the track or removed from the track without removing the rail from its clamped position on the vehicle sidewall.

19. Tonneau means for covering the cargo area of a vehicle, said vehicle having a pair of spaced sidewalls; each sidewall having an outside wall, an upwardly facing top surface (32) and an inner downwardly depending flange (34); said tonneau means comprising:
    a flexible cover having side edges locatable above the vehicle sidewalls so that the cover can extend over the vehicle cargo area;
    a frame including an elongated rail mounted on the top surface of each vehicle sidewall;
    each rail having an outer edge and an inner edge;
    means on the outer edge of each rail for releasably attaching an edge area of the flexible cover to the rail;
    the inner edge of each rail having a longitudinally extending slot presented to the cargo area; and
    a plural number of clamping assemblies for removably clamping each rail to an associated vehicle sidewall; each said clamping assembly comprising a first clip member, a second clip member, and a threaded connector means connected between the first clip member and the second clip member; each said first clip member comprising a one-piece structure having a first leg adapted to overlie the top surface of an associated vehicle sidewall, and a second leg adapted to extend downwardly alongside the depending flange of the vehicle sidewall; each said second clip member comprising a one-piece structure having an upper leg engagable with the downwardly depending flange of the vehicle sidewall, and a lower leg engagable with the second leg of the first clip member below the downwardly depending flange, the lower leg being spaced with respect to the outside wall of the associated vehicle sidewall;
    each said threaded connector means being adapted to extend through the second leg of the first clip member to force the two clip members into clamping engagement with the downwardly, depending flange on the associated vehicle sidewall; the first leg of each said first clip member having structure receivable into said longitudinally extending slot in a direction at right angles to the length of the slot to form an interlocking connection with the associated rail.

20. Tonneau means as defined in claim 10, said cover attachment means comprising a two-part snap fastener having a first part attached to a side edge of the flexible cover, a track extending along the rail, and the snap fastener having a second part slidably movable along the track and engagable with the first part of the snap fastener.

* * * * *